United States Patent

[11] 3,580,133

| [72] | Inventor | Charles William Berthiez<br>5, Avenue Eglantine, Lausanne,<br>Switzerland |
|---|---|---|
| [21] | Appl. No. | 820,943 |
| [22] | Filed | May 1, 1969 |
| [45] | Patented | May 25, 1971 |
| [32] | Priority | May 3, 1968 |
| [33] | | France |
| [31] | | 150,473 |

[54] BALANCE COMPENSATING DEVICE
12 Claims, 8 Drawing Figs.

[52] U.S. Cl. ........................................... 90/11, 90/3
[51] Int. Cl. ........................................... B23c 1/02
[50] Field of Search ........................................... 90/11, 14, 15; 77/3, 3.1

[56] References Cited
UNITED STATES PATENTS
3,168,000  2/1965  Deflandre ..................... 90/11

*Primary Examiner*—Gil Weidenfeld
*Attorney*—Ward, McElhannon, Broocks & Fitzpatrik ABSTRACT: A milling and boring machine having an upright with a front face and a rear face and pulleys slideways on the front face, a saddle mounted for sliding movement on the vertical slideway, the saddle having horizontal slideways on which is mounted a headstock adapted for sliding movement with respect to the saddle. The machine tool is provided with a counterweight for the headstock to balance the horizontal movements of the latter which is fixed in the vertical direction. The balancing means includes a horizontal beam mounted on the upright adapted for pivotal movements around a vertical axis so that one end of the beam constantly hangs over the headstock. A loose pulley is mounted at each end of the beam and flexible extension means pass over both pulleys and connect the headstock to the counterweight on the rear face of the upright. A hydraulic takeup means is provided for the flexible suspension means which is adapted to maintain counterforces between the counterweight and the headstock.

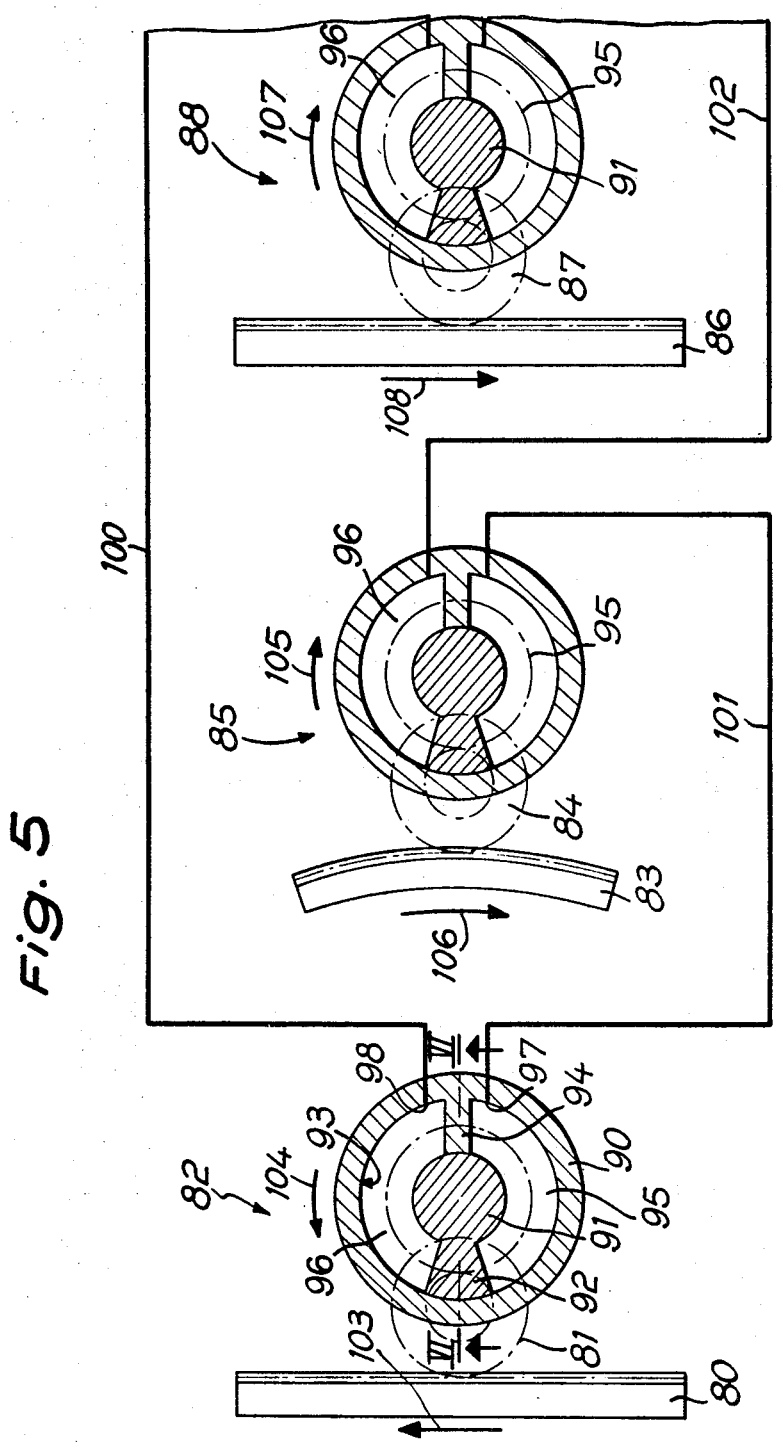

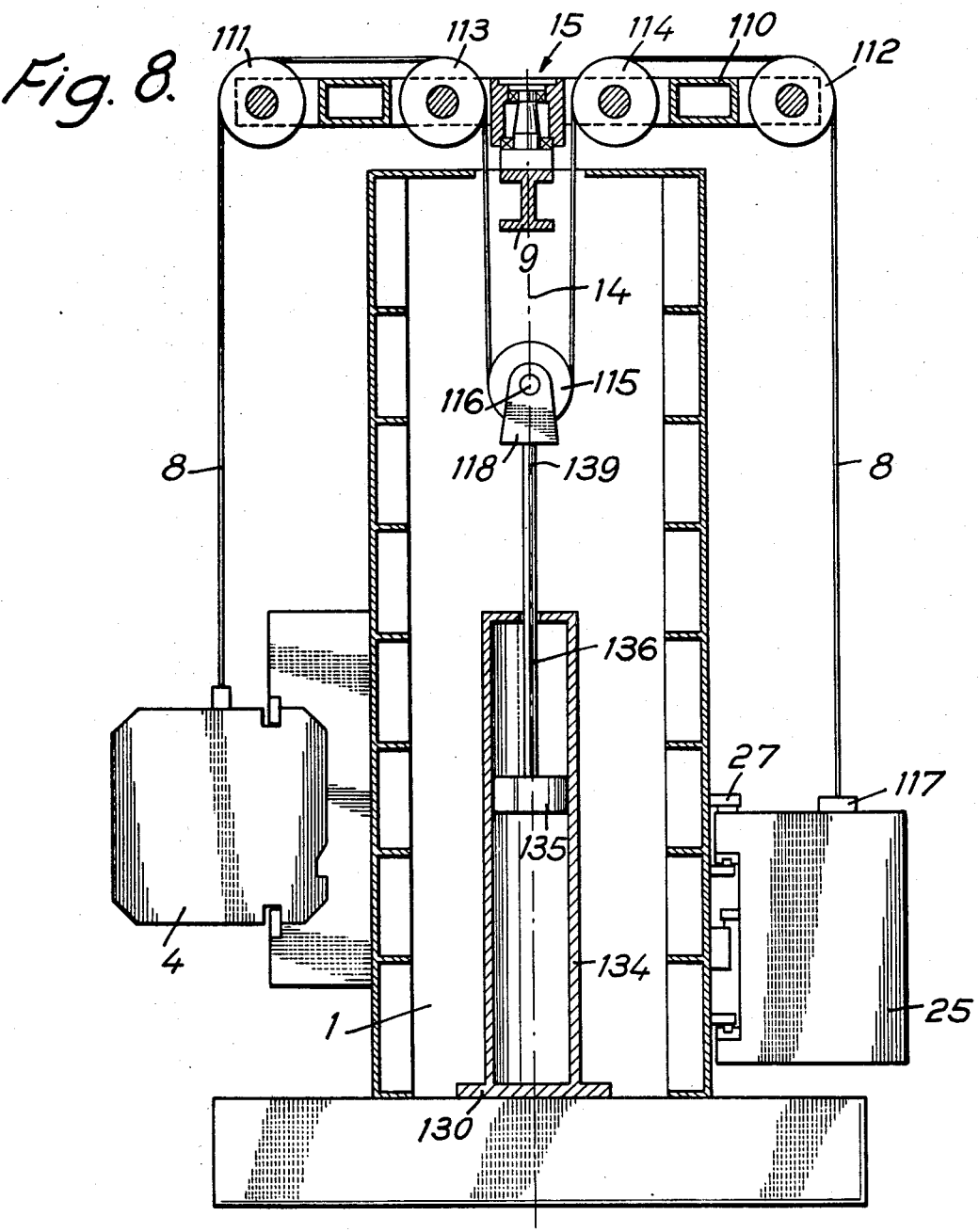

BALANCE COMPENSATING DEVICE

BACKGROUND OF THE INVENTION

The present invention concerns a balance compensating device for members of great weight such as the movable members of large machine tool, of the milling-boring type, for example. The milling-boring machines have an upright including a headstock movably mounted transversely with respect to the vertical direction of the upright; when the headstock is advanced to an end position it is overhanging with respect to the support of the upright.

Generally, this headstock may also be moved vertically on a saddle mounted on vertical slides of the upright. The transverse slides of the headstock are then carried by this saddle. This combination of saddle support and of headstock is of very great weight which is compensated by a balance compensating device, provided to ease the movements of the combination. The balance compensating device may include one or several counterweights movable along the length or in the upright placed in the saddle an the headstock by the intermediary of cables or chains passing on pulleys at the ends of the upright. It may also be constituted by one or several hydraulic traction devices or pneumatic devices including, for example, a cylinder and a piston attached to the frame and the other to an element of the suspension of the headstock and saddle combination. A device of control of the pressure in the cylinder enables exercising a balancing force which is substantially constant on this suspension element.

These balance compensating devices do not enable at all times to compensate the effects of variable overhang due to the movements of the headstock along the transverse slides. These variable overhangs cause forces on the slides which are very harmful to precision.

To overcome these harmful actions several devices have been proposed, for example, use of inclined ramps.

However, this type of device does not enable compensating the effects of overhang of the headstock with respect to the combination of the machine such as the forces of compression of variable importance of the machine on its bed, transmitted by the bed to the levelling jacks, and by the jacks to the foundation; the unequal compression which results from each of these forces causes minimal errors in precisions, but which is summation make certain machining of high precision very questionable.

In view of overcoming these inconveniences, there has already been proposed, for example, in French Pat. No. 1,328,950 filed Apr. 5, 1962 adding to the known balancing device of the headstock by a counterweight a compensating device for the effects of variable overhang due to the advance of the headstock. This consists in mounting to the suspension device of the headstock on a vertical pivoting axis, fixed with respect to the frame of the machine and disposed in such a manner that the center of gravity of the equipment formed by the headstock, the suspension and its counterweight, remains in the vicinity of the vertical of the center of mass, or barycenter of support of the frame whatever the position of the headstock.

In an embodiment, the center of gravity of this equipment is situated on the pivoting axis of the suspension device, which axis passes itself by the barycenter of the support of the machine on its bed. In this manner, when the headstock moves on the slides, its suspension device pivots on its axis and the resulting force which acts on the device constituted by the headstock, its suspension and the counterweight remains on the axis of the pivot. Thus, all forces of tipping or of unequal compression of the supports of the machine caused by the overhang of the movable headstock on its slides are cancelled.

The suspension device of the headstock may consist of an arm pivoted around a vertical axis at the top of the upright of the machine and provided at its two ends with pulleys on which pass the support cables for the headstock; the latter is attached at a point close to the vertical of its center of gravity; at their other ends the cables are mounted to the counterweight. The latter slide on vertical guides mounted on a carriage driven in rotation around the pivoting axis by the suspension arms. Thus, when for a given vertical position of the saddle support, the headstock moves in one direction, the counterweight describes an arc of a circle in the opposite direction.

The invention has for an object to improve such a device in view of providing higher precision for machining, speed of maneuver of the several movable carriages and thus, in a general manner, the efficiency of the considered machine-tool.

To this end, the present invention has for an object a balance compensating device for a member of a machine-tool, movable on slideways such as a headstock of a milling-boring machine, connected to a counterweight by the intermediary of a suspension device movable with respect to the machine around a pivot on a vertical axis, characterized in that the counterweight is fixed in the vertical direction with respect to the machine-tool and that a takeup means is associated with the suspension means between the movable member and the counterweight.

In a preferred embodiment of the invention, the movable member, the counterweight and its suspension means form a movable assemblage whose center of gravity is situated on the axis of the pivot; preferably, the counterweight is movable on rectilinear guides parallel to the slides of the movable member. Generally, the takeup means is of the hydraulic type such as a hydraulic drum or a piston movable in a cylinder by the pressure of a hydraulic fluid, to which are connected the suspension members of the headstock, such as cables or chains.

The advantages provided by the invention are numerous. In cancelling all vertical movement of the counterweight of the movable member or, in a more specific manner, in the case of a milling-boring machine, of the headstock, there is eliminated all the parasitic phenomena accompanying the movements of heavy masses; this is significant in the case of a compensating device of overhang by pivoting suspension where the movements are already numerous. First, the headstock being mounted on a saddle generally guided vertically on the upright, the vertical fixing of the counterweight prevents all oscillation in a vertical sense due to the elasticity of the cables or chains supporting the headstock accompanying the accelerating or slowing movements of raising and lowering of the saddle on the upright.

The variations of length of cables or chains supporting the headstock on the front face of the milling-boring machine due to the mounting or lowering of the saddle are absorbed by the takeup device which maintains permanently a constant tension on the cables; thus the takeup device also exerts constant forces on the headstock and the counterweight between which it is placed.

Also avoided is the risk of oscillations of the counterweight during the pivoting movements of the suspension device of the headstock. The counterweight is preferably placed at the lower portion of the upright, and the center of gravity of the machine is thereby lowered, which betters the stability of the machine. This is particularly advantageous with a suspension device pivoting at the top of the upright. Moreover, it is then very easy to vary the balancing force exerted by the takeup device according to the weight of the accessories mounted on the headstock.

In an embodiment of the invention, the center of gravity of the movable combination formed by the headstock, the suspension means and the counterweight is on their pivoting axis; there is avoided the vertical displacement of a counterweight which is already movable in a horizontal plane. It is moreover possible to mount the counterweight in support against a guide member on the upright parallel to the slides of the headstock.

Thus, its transverse movement can be then exactly symmetric to that of the headstock; the center of gravity of the combination remains perfectly on the axis of the pivot.

Other objects, advantages and capabilities of the invention will become apparent from the following description taken in conjunction with the accompanying drawings showing embodiments of the invention.

ON THE DRAWINGS

FIG. 5 is a schematic and diagrammatic view of the hydraulic circuit for transmitting the movements of the movable member to the pivotable suspension means and the counterweight;

FIG. 8 is a side sectional view corresponding to FIG. 1 illustrating an alternative embodiment of a balance compensating device in accordance with the present invention.

AS SHOWN ON THE DRAWINGS

In FIG. 1 to 7 is shown a milling and boring machine equipped with a balance compensating device according to the present invention in which a counterweight is movable horizontally at the lower portion of the frame on slides parallel to the slides of the headstock of the milling-boring machine. At the interior of the counterweight is mounted a hydraulic cylinder in which slides a piston supplied with a rod which is a takeup means for the suspension means of the headstock as will be set forth below.

Figure 1:
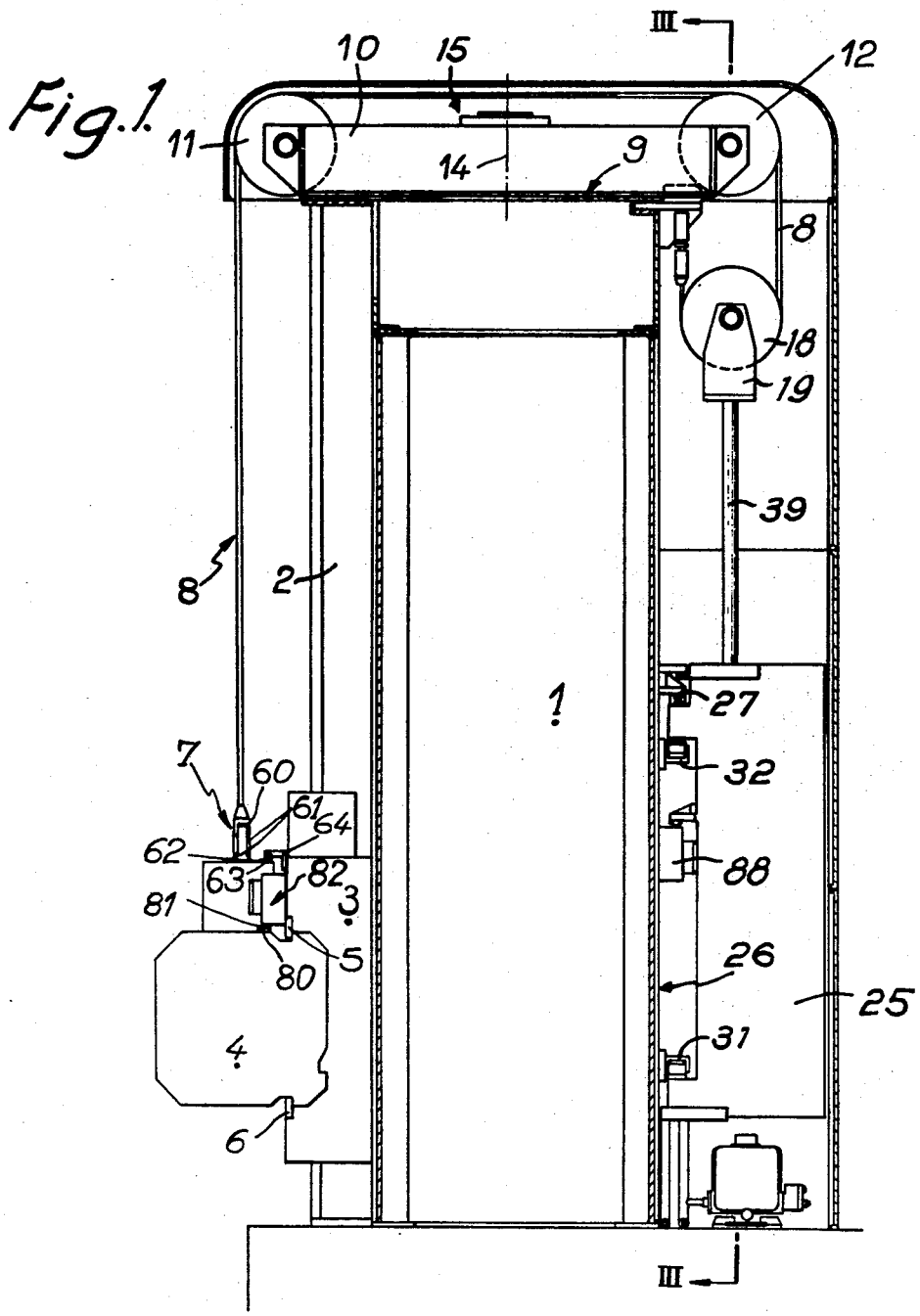
FIG. 1 is a side view of a milling and boring machine incorporating a balance compensating device in accordance with the present invention.

As will be seen on FIG. 1, the upright 1 of the milling-boring machine has vertical slides 2 on which slides a saddle 3 supporting a headstock 4 which is movable horizontally along slides 5, 6.

The headstock 4 is suspended by a pivotable member 7 to four cables 8. At the top of the upright 1 is a pivotable beam 10 including at each of its ends pulleys 11, 12, on which pass the cables 8.

Figure 4:
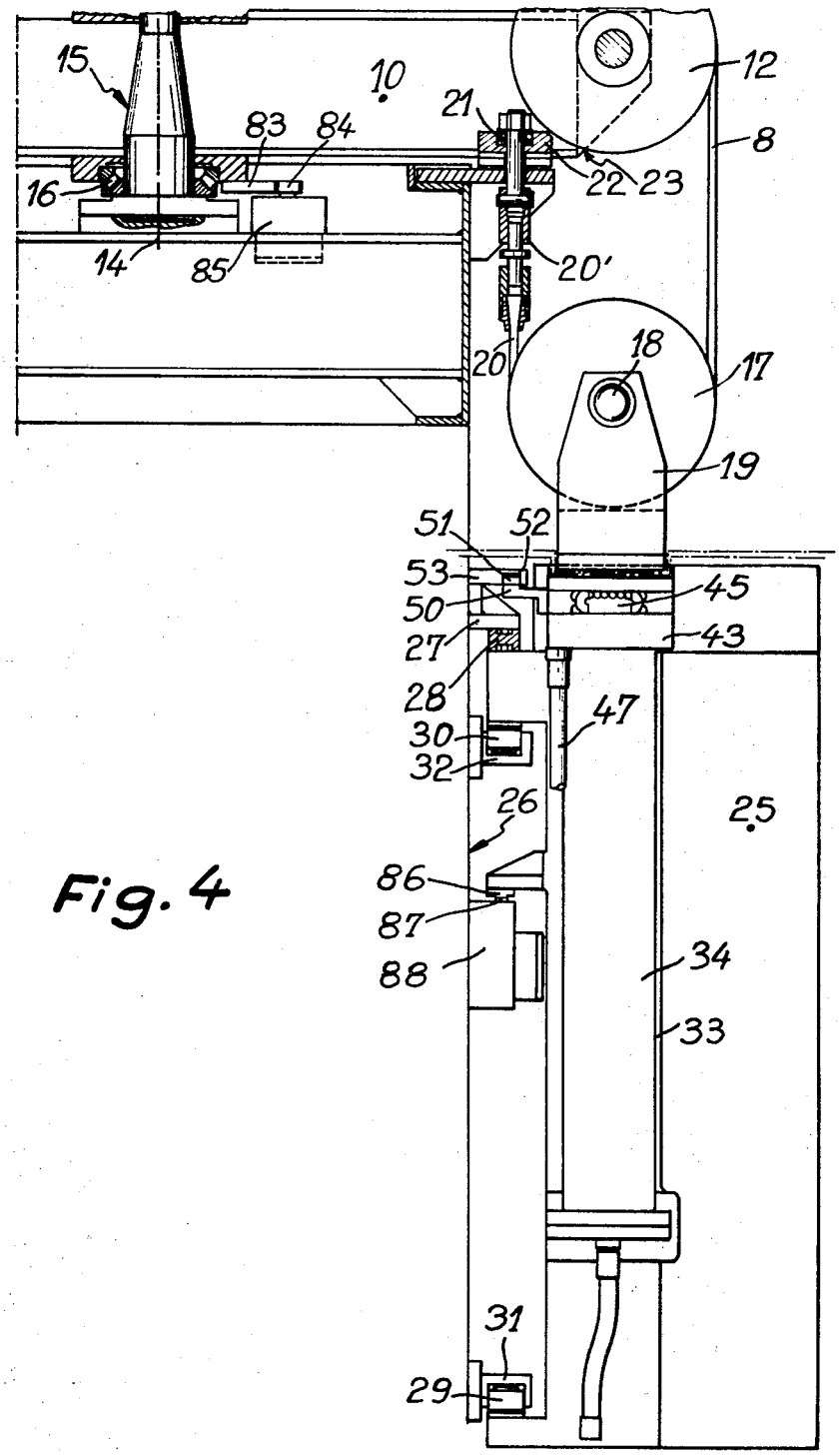
FIG. 4 is a partial enlarged view to the same scale as FIG. 3 taken along the line IV–IV of FIG. 2.

The beam 10, FIG. 4 is pivotably mounted in a horizontal plane at the top 9 of the upright 1 on a vertical pivot 15 including a conical bearing 16 and a cylindrical roller bearing 13.

At the exit from the pulley 12, the cables 8 pass through idlers 17, the common axis 18 of which is mounted on a yoke 19. The ends 20 of the cables 8 are fixed in a member 20', pivotably mounted through the intermediary of ball bearing 21 on a shoe 22 attached to the end 23 of the beam 10.

A counterweight 25, FIG. 4, whose weight is equal to that of the headstock is mounted on the rear face 26 of the upright 1 and guided in a horizontal direction parallel to the direction of movement of the headstock 4 on the slides 5 and 6. This guiding is assured by a rectilinear guide 27 attached to the upright 1 on which bear in the upward direction a pair of roller shoes 28, mounted to the counterweight 25. Moreover, the counterweight 25 is maintained at a distance from the rear face 26 of the upright 1 by two sets of rollers 29 and 30 whose axis are fixed respectively in the vicinity of the lower end and upper end. The rollers 29, 30 are capable of rolling on a pair of rails 31, 32 of L-form secured to the rear face 26 of the upright 1.

Figure 3:
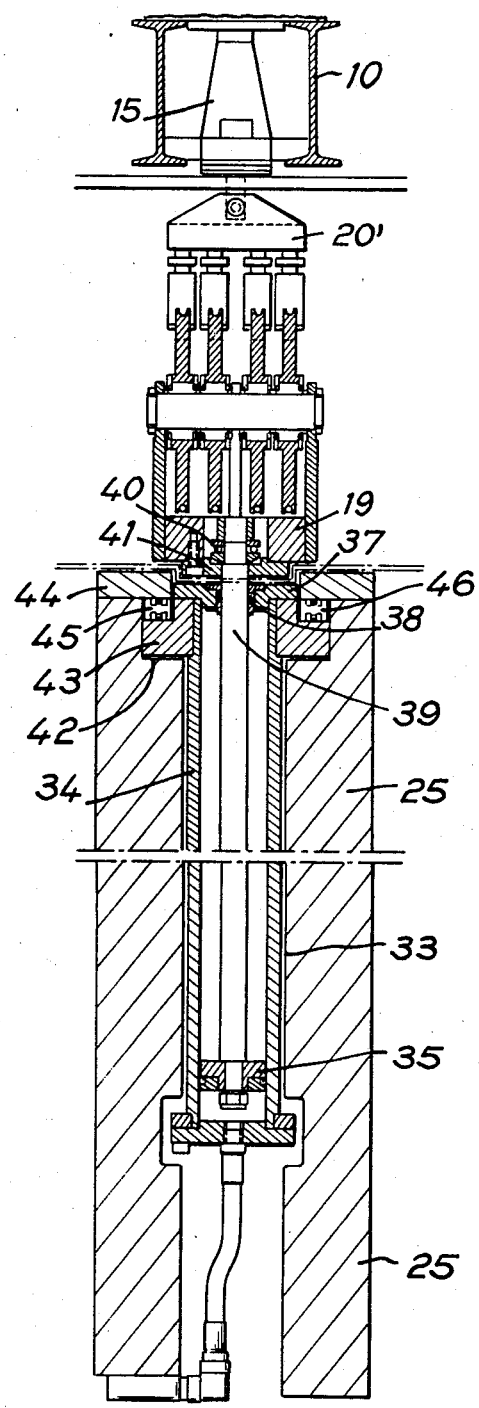
FIG. 3 is an enlarged view taken along the line III–III of FIG. 1.

The inner portion of the counterweight 25 is bored to form a vertical housing 33 in which is mounted a hydraulic cylinder 34 provided with a piston 35, FIG. 3. The piston 35 is attached to a rod 36 which passes at the upper end of the cylinder 34 through a plug member 37 with a fluidtight joint 38. The upper end 39 of the piston 36 is mounted to the yoke 19 through the intermediary of a ball joint 40 which is supported on a plate 41 screwed to the lower portion of the yoke 19.

At the upper end of the counterweight 25, FIG. 3, the housing 33 includes an enlarged portion 42 in which is housed a flange 43 attached to the cylinder 34. The upper portion of the housing 33 of the counterweight 25 is closed by a plate 44 against which is applied a pair of roller shoes 45, 46 attached to the flange 43. The cylinder 34 is therefore able to move within the counterweight 25 on a short distance parallel to the plane IV–IV of FIG. 2.

With respect to FIG. 4, it will be seen that a foot 50 attached to the flange 43 carries a vertical roller 51 engaged in an arc shaped slot 52 milled in a member 53 attached to the upright 1. The arc of the circle of the slot 52 is centered on the axis 14 of the pivot 15 in such a manner that when the beam 10 pivots around the axis 14 of the pivot 15 accompanied by the sliding of the counterweight 25 on its guides, the cylinder 34, mounted to the yoke 19 by the intermediary of the rod 36 of its piston 35 turns also around the axis 14, guided in this movement by the roller 51 rolling in the slot 52; thus the direction of the cables 8 between the pulleys 12 and the idlers 17 remains always vertical.

During this movement, the counterweight 25 moves rectilinearly along the guide 27. It results from the displacement of the counterweight 25 and the cylinder 34 along two distinct paths that the cylinder 35 moves with respect to the counterweight 25 at the interior of its housing 33; this displacement is effected parallel to the plane IV–IV of FIG. 2 due to the roller surfaces 45, 46. Whatever the angular position of the beam 10, the yoke 19 is capable of pivoting around the ball joint 40 connecting the rod 36 of the piston 35 in such a manner that the plane of the idlers 17 remains always parallel to that of the pulleys 12 carried at the ends 23 of the beam 10.

There is thus seen the provision which enables the direction of the cables 8 connecting the pulleys 12 to the idlers 17 to remain vertical whatever the angular position of the beam 10 by relative movement of the cylinder 34 guided in rotation around the axis 14 of the pivot 15, and of the counterweight 25 in its rectilinear movement along the guide 27.

An identical problem arises for the mounting of the headstock 4 to the cables 8 passing over the pulley 11. It is resolved in an analogous manner by the pivotable member 7 of which the construction for this purpose is described below. The end 60 of the cable 8, FIG. 1, is mounted through the intermediary of a ball joint (not shown) to a member 61 supporting the headstock 4. The member 61 includes a carriage movable on the headstock, parallel to the plane IV–IV of FIG. 2, on path near the vertical of the center of gravity of the headstock. The control of the movement of the carriage with respect to the headstock is effected by the aid of a foot 62 bearing a vertical roller 63 which slides in a circular slot centered on the axis 14 of the pivot 15 and milled in a member 64 joined to the saddle 3 which supports the headstock 4.

Figure 7:
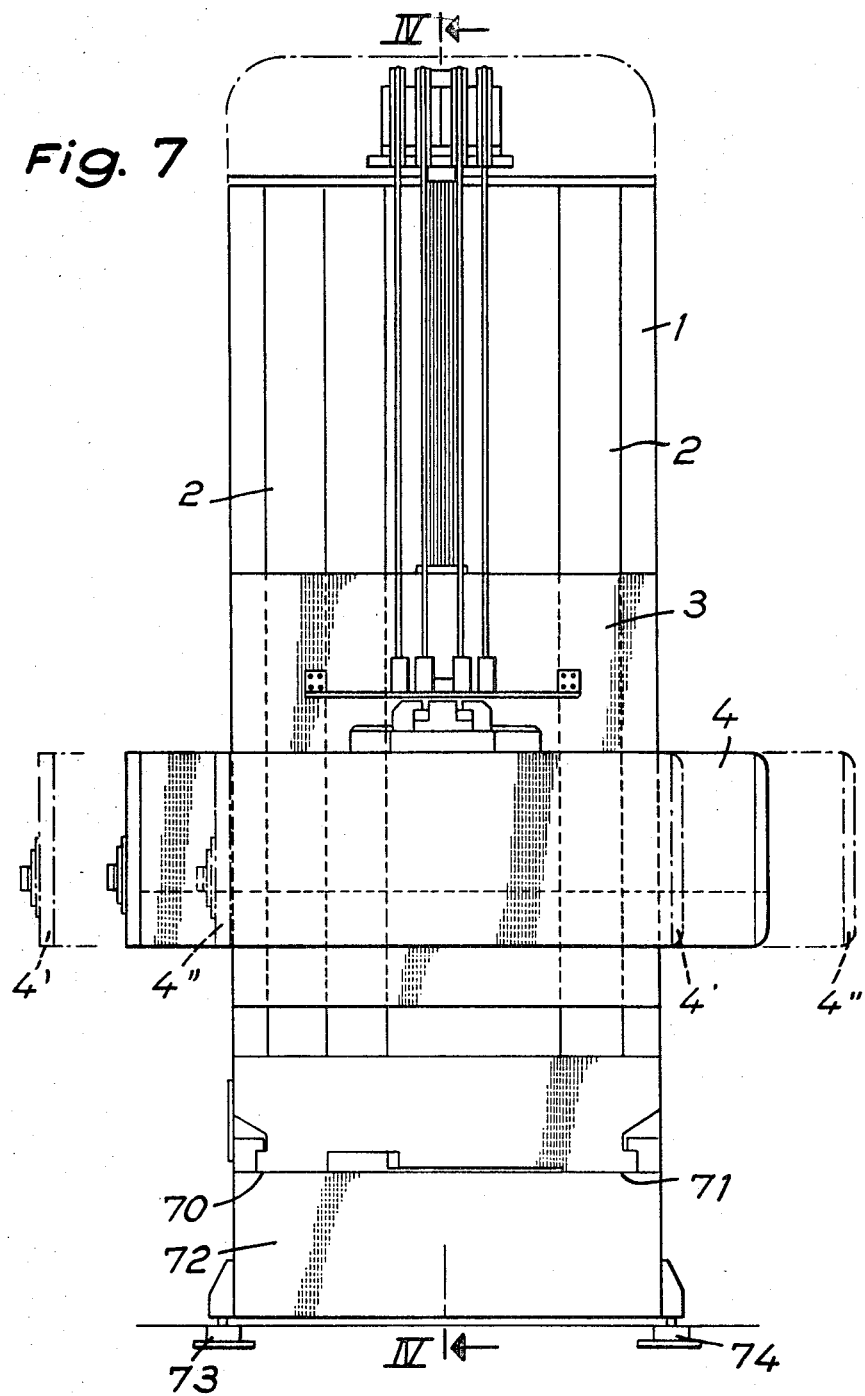
FIG. 7 is a front view of a milling and boring machine corresponding to FIGS. 1 and 2, illustrating the end positions of the headstock with respect to saddle.

FIG. 7 enables understanding the role of the balance compensating device which has been described and whose function will be set forth below. FIG. 7 is a front view of the boring-milling machine of FIGS. 1 to 4, with the upright 1, and the vertical slides 2 of the movable saddle 3. The saddle 3 supports the headstock 4 which is movable horizontally on the slides 5, 6 carried by the saddle 3. There is shown in full lines the median position of the headstock in which its center of gravity is found in the plane of vertical symmetry of the upright 1, FIG. 7, and in fine lines the two end positions 4', 4'', of advance and retraction of the slides 5, 6 of the headstock 4. It is to be noted that in the two end positions, the center of gravity of the headstock is clearly offset with respect to the plane of symmetry IV–IV of the upright, the resulting overhang tending, in the absence of compensation, not only to vary the forces of the headstock 4 and the saddle 3 along their slides, as a function of the position of the headstock 4, but also to cause an unequal compression on the oil films on the slides 70, 71 of the bed 72 of the machine tool, as well as unequal tipping action on the jacks 73 and 74, supporting the bed and on their foundation.

The weight of the counterweight 25 is equal to the average weight of the headstock 4, that is, to its weight, equipped with a regular spindle and the connection between this counterweight and the headstock is assured by the hydraulic cylinder 34. This cylinder is supplied with fluid under pressure by a conduit 47 to provide a force on the yoke 19 equal to twice of the headstock, FIG. 4. Effectively, the total tension in the cables 8 is equal to the weight of the headstock 4, and it is applied on each side of the idlers 17 supporting the yoke 19. The force exerted on the yoke 19 ought thus to be balanced by the cylinder by a traction equal to twice the weight of the headstock.

By reaction, the counterweight 25 will exert on the guide 27, which prevents movement in the vertical direction, a force equal to the difference between the traction of the hydraulic cylinder 34 and its own weight, that is, a force practically equal to the weight of the headstock if it is conventionally equipped. Under this force directed from below to above works the rear portion of the upright 1 works in compression; this force is balanced by the opposite traction force of the cable 20 on the shoe 22.

Figure 2:
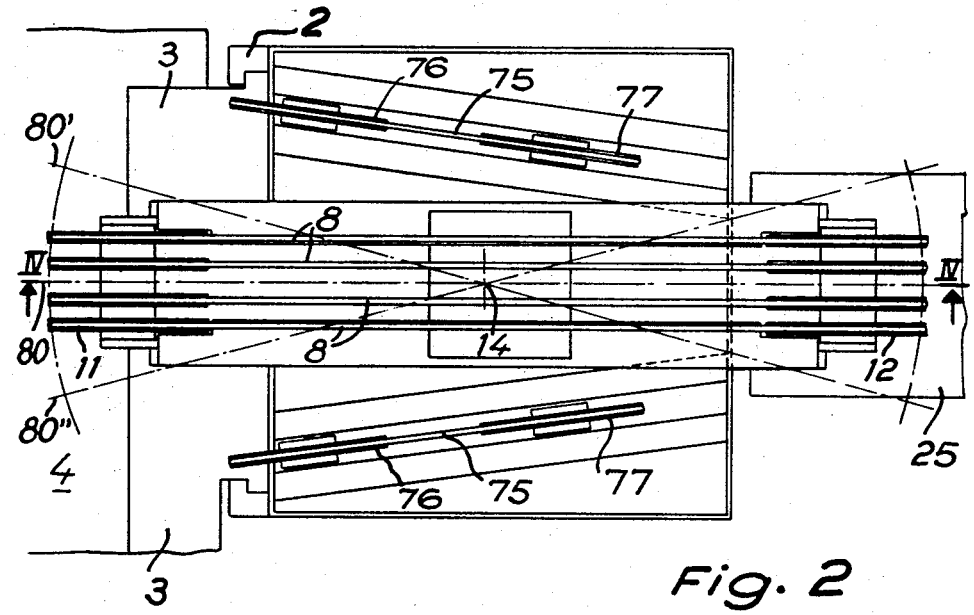
FIG. 2 is a top view of the machine of FIG. 1.
Figure 6:
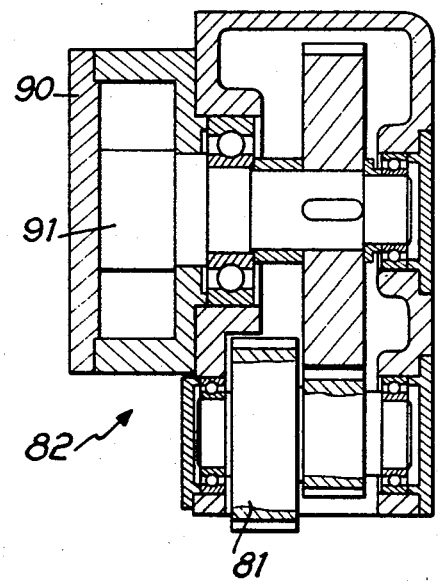
FIG. 6 is an enlarged view of one of the hydraulic transmission members illustrated in FIG. 5, taken along the line VI–VI of FIG. 5.

FIG. 2 thus enables understanding how the balance compensating device of the headstock 4 accompanying the headstock in its movements may compensate the effects of overhang likely to result. On this FIG. are seen the four cables 8 which support the headstock 4 and which pass over the pulleys 11, 12 at the ends of the pivoting beam 10; a pair of cables 75 passes over a pair of pulleys 76, 77 to which is suspended the saddle 3 supporting the headstock 4. At their ends, the cables 75 are associated with a movable counterweight or preferably in this case, connected to a hydraulic balancing device enabling balancing the weight of the saddle 3. This equipment is movable in the vertical direction only.

The vertical movements of the saddle cause variations of the length of the front part of the suspension cables of the cables 8, variations of length which are absorbed by the traction apparatus which comprises the hydraulic cylinder 34.

When the headstock 4 moves horizontally, the beam 10, FIG. 2, pivots around the axis 14 of the pivot 15 in order to follow the movements of the headstock 4 until its plane of symmetry 80 occupies the two positions 80' and 80" corresponding to the end positions 4' and 4" of the movements of the headstock 4 (FIG. 7). At the same time, the counterweight 25 suspended at the rear of the beam 10 through the intermediary of the hydraulic cylinder 34 and the piston 35, moves linearly in opposite direction with respect to the headstock along the guide 27, FIG. 2.

It is to be noted that the forces exerted on the pivoting beam 10 are always vertical and that their resulting force is always on the axis 14 of the pivot 15 whatever the position of the headstock: the integral compensation of the headstock overhanging forces is realized.

It is possible to adjust with precision the traction force exerted by the cylinder 34 in such a manner that this compensation is obtained whatever the weight of the equipment carried by the headstock; any tendency of the beam to tip in the vertical plane around the pivot is prevented; if the position of the pivot axis is such that it passes by the barycenter of the supports of the upright on the bed, all the movable parts of the boring-milling machine will always be perfectly balanced. The effects of overhang due to the movements of the headstock are not only compensated with respect to the saddle which supports said headstock, but with regard to the entire machine tool.

There is provided a synchronization between the movements of the headstock 4 on the one hand, the pivoting beam 10 and the counterweight 25 on the other hand. This synchronization may be effected by mechanical means; it may also be effected, as will be described below with respect to FIGS. 5 and 6, by a transmission of the hydrostatic type.

With respect to FIG. 1, it is seen that the headstock 4 carries at its upper portion a rack 80, which drives a toothed pinion 81 on the saddle 3 driving itself a device 82 generally referred to as a transmitter. With respect to FIG. 4, it is noted, that the beam 10 includes in the vicinity of the pivot 15 a toothed section 83 centered on the axis 14 driven by a pinion 84 itself driven by a hydraulic device 85 generally noted as a receiver. Finally, the counterweight 25 is itself supplied with a rack 86 driven by a pinion 87 engaged by a second receiver 88.

FIG. 5 schematically and diagrammatically illustrates how the hydraulic elements 82, 85, 88 are constituted and connected. Each comprises a circular chamber 90 within which is rotatably mounted a paddle 91 whose end 92 slides in tight contact with the internal wall 93 of the chamber 90. The chamber 90 includes moreover a radial wall 94 whose end is in fluidtight contact with the paddle 91 in such a manner that the chamber 90 is divided by the wall 94 and the movable paddle 91 in two compartments 95, 96 of variable volume. In each of the two chambers 95, 96 is an entry opening or exit opening for hydraulic fluid. These openings are 97 for chamber 95 and 98 for chamber 96, respectively.

FIG. 5 shows the rack 80 of the headstock 4, the toothed sector 83 associated with the beam 10, and the rack 86 mounted to the counterweight 25, as well as the pinions 81, 84 and 87 engaged by these racks. Each of these pinions is engaged by the rotatable paddle 91 through the intermediary of a transmission which may be seen on FIG. 6 for the transmitter 82.

The chamber 96 of the transmitter 82 is connected to the chamber 96 of the receiver 88 by a hydraulic pipe 100. The chamber 95 of the transmitter 82 is connected to the chamber 95 of the receiver 85 by a hydraulic pipe 101. The chamber 96 of the receiver 85 is connected to the chamber 95 of the receiver 88 by a pipe 102. From this, the functioning of the hydrostatic transmissions is as set forth below.

When the movable headstock 4 and its rack 80 start a movement in the direction of the arrow 103, it drives the paddle 91 in the direction of the arrow 104; the hydraulic fluid in the chamber 95 is pushed in the chamber 95 of the receiver 85 whose paddle turns in the sense of the arrow 105. This causes the rotation of toothed sector 84 of the beam 10 in the sense of the arrow 106 which, as may be seen on FIG. 2, for example, correspond to the accompanying of the headstock 4 in its displacement. At the same time, the fluid in the chamber 96 of the receiver 85 is delivered to the chamber 95 of the receiver 88 while the fluid of the chamber 96 of the receiver is delivered in the chamber 96 of the transmitter 82 whose volume increases. There results that the paddle 91 of the receiver 88 turns in the sense of the arrow 107 and causes the movements of the rack 86 of the counterweight 25 in the sense of the arrow 108, that is in direction opposite to the movement of the headstock 4.

The embodiment of the invention which has been described may be evidently made the object of all variations with respect to the general principals of the invention. The synchronization methods of the different movable devices of the machine-tool noted above by hydrostatic transmission may be replaced by other equivalent systems such as mechanical transmissions, hydraulic motors, or simple jacks, or by electrical transmission.

The use of a tackle block, such as formed by idlers 17 and yoke 19 between the cables 8 and the rod 36 of the piston 35 enables reducing the paths of the latter and, consequently, the height of the cylinder. It is however evident, that according to the space available it is possible to mount the cables directly on the ends 39 of the rod 36 or, to the contrary, utilize a linking means of greater complexity.

With respect to the traction or takeup means, it may also be constituted by, for example, a reversible drum driven by a hydraulic motor to replace the hydraulic cylinder described above and mounted on or in the counterweight.

Finally, the disposition of the takeup means or traction device between the counterweight and the headstock may be altered. In the above-noted embodiment, the traction device acted by its piston on the headstock and in reaction through the roller surfaces 45 46 on the counterweight. FIG. 8 represents in a view similar to that of FIG. 1 a milling-boring machine, incorporating an alternative embodiment of the invention. The traction device consists in a hydraulic cylinder supplied with a piston and placed inside the upright 1 of the machine tool. The methods of suspension and guiding of the headstock 4 and the counterweight 25 remain identical. In contrast, the pivoting beam 110 includes four pulleys, 111, 112, 113, 114. The cables 8 pass first on the pulleys 111 and 113 before forming an attachment through the aid of idlers 115 whose axis 116 crosses the axis 14 of the pivot 15, analogous to the pivot of the principal embodiment. The cables 8, at the exit of the attachment, pass on the pulleys 114 and 112, and are attached at their ends 117 to the top of the counterweight 25 placed at the base of the upright 1.

The axis 116 of the pulleys 115 supports a yoke 118 mounted by a joint identical to the ball joint 40, to the upper portion 139 of the rod 136 of the piston 135 coaxial to the axis 14 of the pivot 15 and movable in a hydraulic cylinder 134 rigidly mounted to the base of the upright 6 by a flange 130. The traction device thus formed exerts two equal actions on the headstock and the counterweight and a reaction of twice their value and oriented from bottom to top in the axis 14 of the pivot 15 on the bed of the machine tool. In this embodiment the guide 27 only plays the role of guiding the counterweight.

Although many modifications might be suggested by those versed in the art, it should be understood that I wish to embody within the scope of the patent wanted hereon or such modifications as reasonably and properly come within the scope of my contribution to the art.

I claim:

1. A balance compensating device for a member of a machine tool movable transversely with respect to an upright, such as a headstock movable on the horizontal slideways of a saddle in a milling and boring machine, said member being connected to a counterweight through suspension means movable with respect to the upright around a pivot on a vertical axis, including means to mount the counterweight on the upright, said mounting means preventing vertical movement of said counterweight with respect to said upright, and takeup means adapted to act on said suspension means to provide a balancing force between said movable member and said counterweight.

2. A balance compensating device according to claim 1, wherein said movable member, said counterweight and said suspension means form a movable assemblage whose center of gravity is situated on the axis of the pivot.

3. A balance compensating device as recited in claim 1, wherein the counterweight is movable rectilinear and parallel to the transverse movement of the movable member and said counterweight being vertically fixed at the lower portion of said upright by horizontal guide means attached to said upright.

4. A balance compensating device as recited in claim 3, including means to synchronize the movements of said movable member, said takeup means and said counterweight.

5. A balance compensating device according to claim 4, wherein said synchronization means includes a hydrostatic transmission having three elements associated with said suspension means, movable member and counterweight, by a mechanical transmission each of said three elements presenting a chamber for fluid separated in tow compartments of variable volume by a fluid tight rotatable paddle.

6. A balance compensating device according to claim 1, wherein said takeup means is mounted in said counterweight.

7. A balance compensating device according to claim 1, wherein said takeup means is mounted on the machine frame, the resulting force on said takeup means on the frame being directed in the axis of the pivot of said suspension means.

8. A balance compensating device according to claim 1, wherein said suspension means includes flexible members passing over pulley means, said pulley means being supported by a horizontal pivoted arm on said upright.

9. A balance compensating device according to claim 8, wherein said flexible members are connected to said takeup means by idler and yoke means.

10. A balance compensating device according to claim 8, wherein said movable member and said counterweight are connected to said flexible members by a pivotable member including means movable in such a manner as to maintain said flexible members vertical without torsional forces which would alter the position of the movable member.

11. A balance compensating device according to claim 1, wherein said takeup means is a hydraulic cylinder having a piston.

12. A balance compensating device according to claim 1, wherein said takeup means is a reversible hydraulic drum.